United States Patent
Enerhaug et al.

(10) Patent No.: US 9,494,703 B2
(45) Date of Patent: Nov. 15, 2016

(54) MARINE GEOPHYSICAL DEFLECTOR FOR TOWING OF SEISMIC ARRAYS

(71) Applicant: ULMATEC BARO AS, Fosnavåg (NO)

(72) Inventors: Birger Enerhaug, Ranheim (NO); Karl-Johan Mork, Ulsteinvik (NO)

(73) Assignee: ULMATEC BARO AS, Fosnavåg (NO)

( * ) Notice: Subject to any disclaimer, the term of this patent is extended or adjusted under 35 U.S.C. 154(b) by 0 days.

(21) Appl. No.: 14/407,036

(22) PCT Filed: Jun. 20, 2013

(86) PCT No.: PCT/NO2013/050115
§ 371 (c)(1),
(2) Date: Dec. 10, 2014

(87) PCT Pub. No.: WO2014/003573
PCT Pub. Date: Jan. 3, 2014

(65) Prior Publication Data
US 2015/0168578 A1  Jun. 18, 2015

Related U.S. Application Data

(60) Provisional application No. 61/664,402, filed on Jun. 26, 2012.

(30) Foreign Application Priority Data

Jun. 26, 2012 (NO) .................................. 20120742

(51) Int. Cl.
*G01V 1/38* (2006.01)
*B63B 21/56* (2006.01)
*B63B 21/66* (2006.01)
*B63G 8/42* (2006.01)

(52) U.S. Cl.
CPC ............. *G01V 1/3826* (2013.01); *B63B 21/56* (2013.01); *B63B 21/66* (2013.01); *B63B 21/663* (2013.01); *B63G 8/42* (2013.01)

(58) Field of Classification Search
CPC ......... B63G 8/42; B63B 21/56; B63B 21/66; B63B 21/58; G01V 1/38
USPC ............... 114/242, 244, 245; 367/16, 17, 18
See application file for complete search history.

(56) References Cited

U.S. PATENT DOCUMENTS

| | | | |
|---|---|---|---|
| 3,613,629 A | 10/1971 | Rhyne et al. | |
| 4,130,078 A * | 12/1978 | Cholet | G01V 1/3826 114/244 |
| 4,729,333 A | 3/1988 | Kirby et al. | |
| 5,443,027 A | 8/1995 | Owsley et al. | |
| 6,267,070 B1 | 7/2001 | Russell et al. | |

(Continued)

FOREIGN PATENT DOCUMENTS

| | | |
|---|---|---|
| NO | 331725 B1 | 3/2012 |
| WO | 2 203 288 A1 | 8/1973 |

*Primary Examiner* — Lars A Olson
(74) *Attorney, Agent, or Firm* — Birch, Stewart, Kolasch & Birch, LLP

(57) ABSTRACT

A marine geophysical deflector for towing seismic arrays includes a float main body with one or more deflector wings extending downwards into the sea, and one or more slender top float elements arranged generally in a longitudinal direction on top of the main body. The number of the top float elements may be two or more. There may be arranged two or more distance floats below the float main body and an upper horizontal plate at the top of the one or more deflector wings.

24 Claims, 16 Drawing Sheets

(56) References Cited

U.S. PATENT DOCUMENTS

| | | |
|---|---|---|
| 6,508,191 B1 | 1/2003 | Spoljaric |
| 6,532,189 B2 * | 3/2003 | Barker .................. B63B 21/66 114/244 |
| 6,755,144 B1 | 6/2004 | Hocquet et al. |
| 7,121,909 B1 | 10/2006 | Meyerhoffer |
| 2002/0064091 A1 | 5/2002 | Barker |
| 2008/0022913 A1 | 1/2008 | Toennessen et al. |
| 2008/0041294 A1 | 2/2008 | Diorio et al. |
| 2012/0006249 A1 | 1/2012 | Harder |
| 2012/0067265 A1 | 3/2012 | Valo |

* cited by examiner

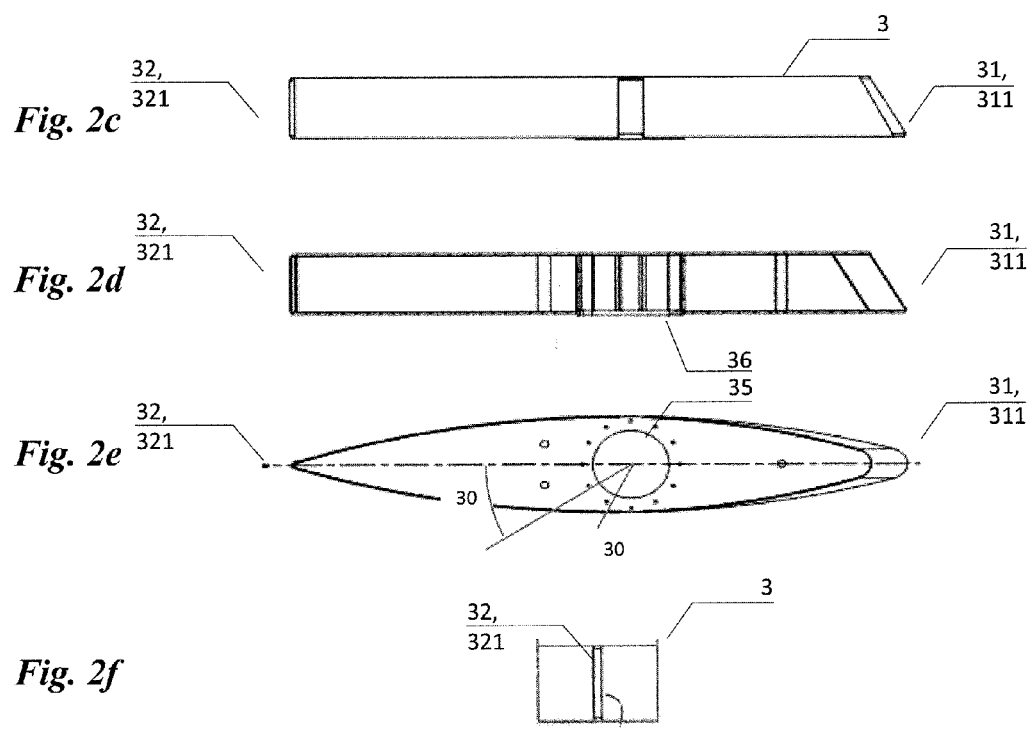

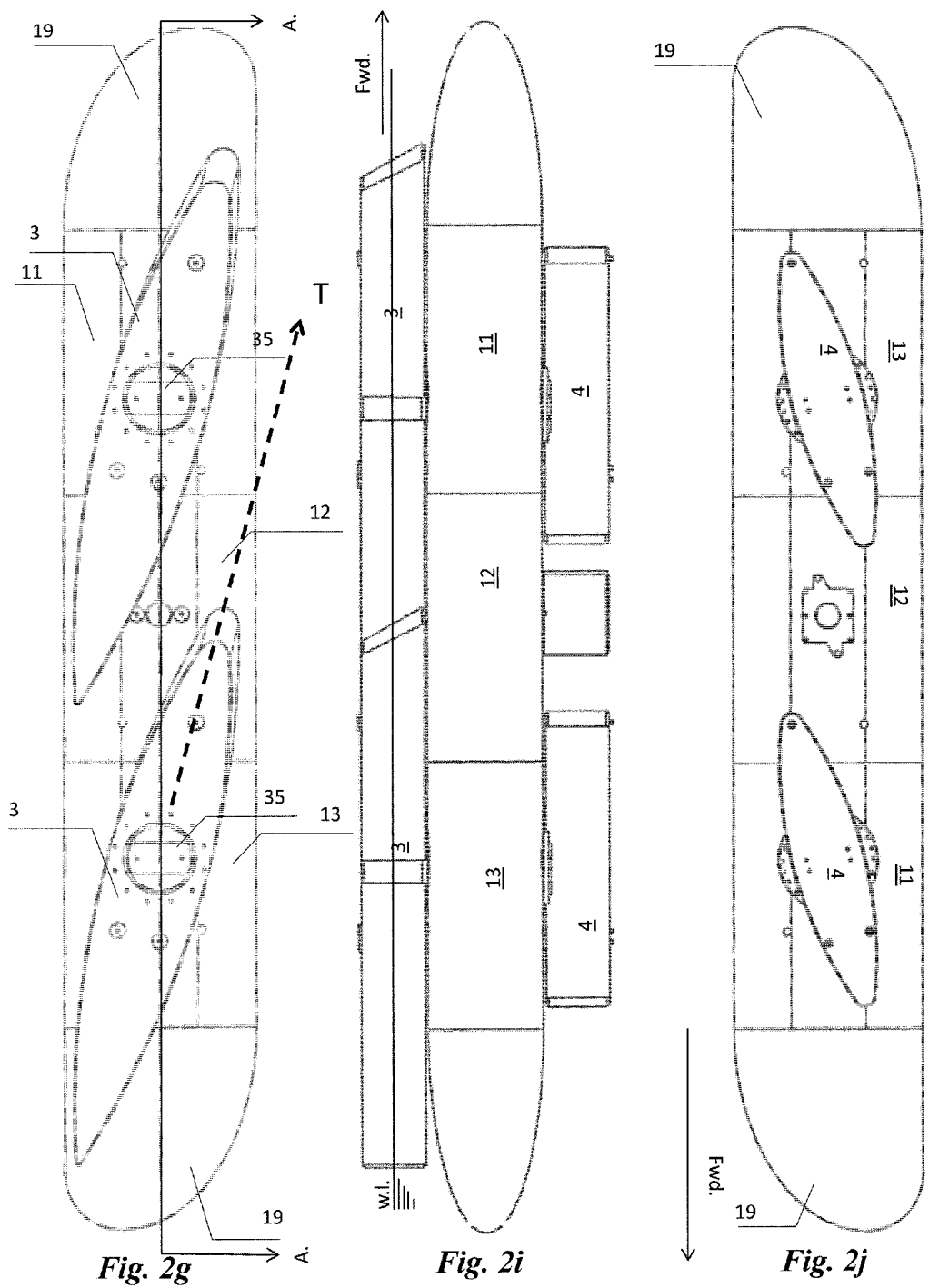

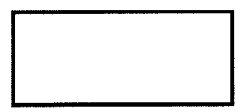
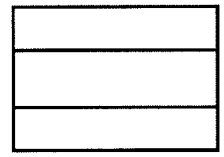
*Fig. 4a*  *Fig. 4b*
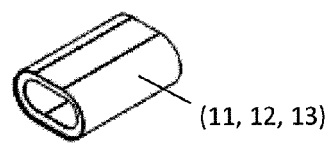
(11, 12, 13)
*Fig. 4c*  *Fig. 4d*
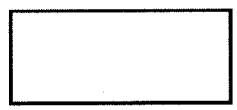
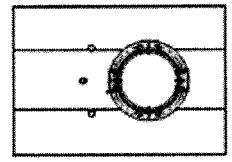
*Fig. 5a*  *Fig. 5b*
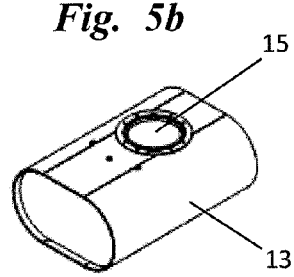
15
13
*Fig. 5c*  *Fig. 5d*

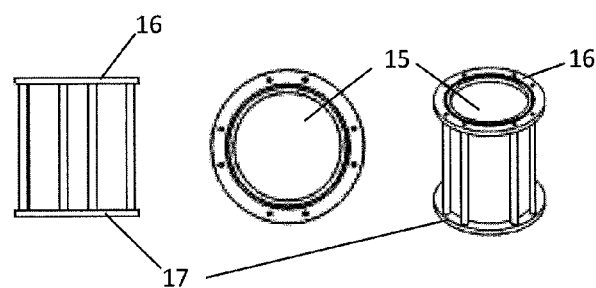
*Fig. 8*
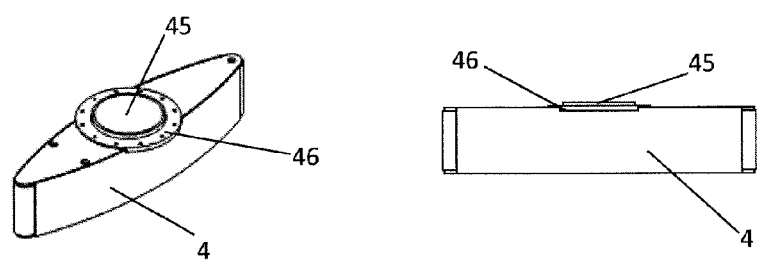
*Fig. 9a*  *Fig. 9b*
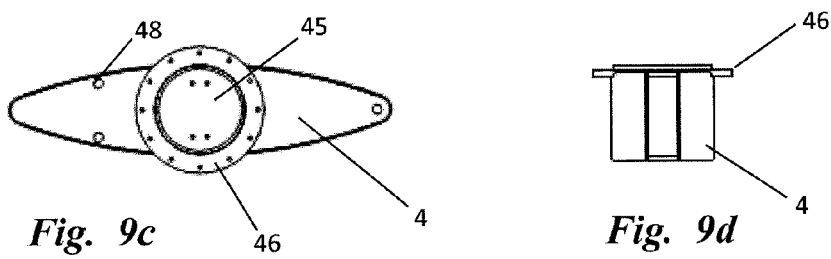
*Fig. 9c*  *Fig. 9d*

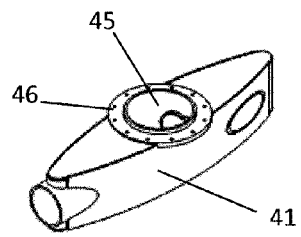
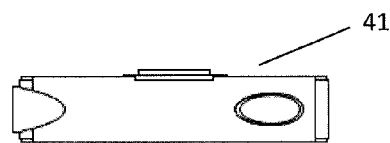
Fig. 10a        Fig. 10b
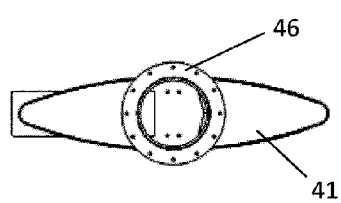
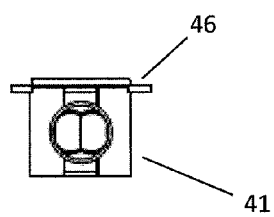
Fig. 10c        Fig. 10d
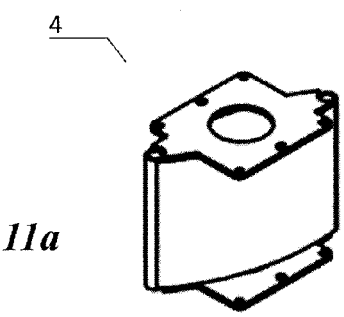
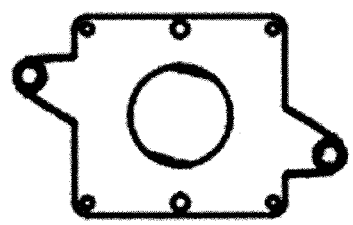
Fig. 11a        Fig. 11b
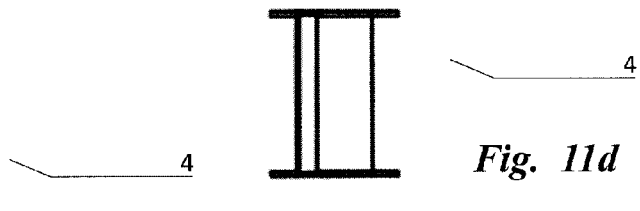
Fig. 11c        Fig. 11d

MARINE GEOPHYSICAL DEFLECTOR FOR TOWING OF SEISMIC ARRAYS

CROSS REFERENCE TO RELATED APPLICATIONS

This application is the National Phase of PCT International Application No. PCT/NO2013/050115, filed on Jun. 20, 2013, which claims priority under 35 U.S.C. 119(e) to U.S. Provisional Application No. 61/664,402, filed on Jun. 26, 2012 and under 35 U.S.C. 119(a) to Patent Application No. 20120742, filed in Norway on Jun. 26, 2012, all of which are hereby expressly incorporated by reference into the present application.

FIELD OF THE INVENTION

The invention is a marine geophysical deflector for towing seismic arrays. The marine geophysical deflector comprises a float main body with one or more deflector wings extending downwards into the sea. A seismic survey vessel or towing vessel tows a broad and long array of seismic cables, and the array of cables is spanned out by a starboard and a port side deflector also towed by the vessel.

BRIEF SUMMARY OF THE INVENTION

The invention is a marine geophysical deflector for towing seismic arrays, comprising a float main body (1) with one or more deflector wings (2) extending downwards into the sea, and one or more slender top float elements (3) arranged generally in a longitudinal direction on top of said main body (1).

In an embodiment of the invention the number of said top float elements (3) is two.

In an embodiment of the invention the one or more top float elements is arranged with a deviation angle relative to the longitudinal direction of said main body, in the direction of the course of the deflector through the sea, as the main body usually is directed with an outward deviation angle, the port deflector's main float to port, and the starboard deflector's main float to starboard, so as for each of the vertical wings, usually four in each deflector, to be exposed to the sea in the course direction, please see "T" in FIG. 1a.

In an embodiment of the invention two or more distance floats (4, 41) each are arranged beneath said main float (1) and for being connected directly or indirectly to said one or more deflector wings (2) below.

Stated otherwise, the invention may be seen as a marine geophysical seismic array towing deflector comprising a float main body (1) with one or more deflector wings (2) extending downwards into the sea, and two or more distance floats (4, 41) each arranged beneath said main float (1) and for being connected directly or indirectly to said one or more deflector wings (2) below.

In an embodiment of the invention the two or more distance floats are arranged with a deviation angle relative to the longitudinal direction of said main body, in the direction of the course of the deflector through the sea.

In an embodiment of the float defined this way, it comprises one or more slender top float element (3) arranged generally in a longitudinal direction on top of said main body (1).

Advantages of the Invention

A first advantage of the invention is that the towing resistance relative to the achieved deflector force is reduced. Another advantage is that the course stability is improved. A further advantage is that the towing noise incurred just due to the passage of the deflector float through the sea is reduced. This also includes a reduced wave formation at the surface.

In general, the design waterline of the assembled paravane shown in FIG. 1a in its operative state, being pulled by a towing line from a seismic vessel, and spanning a towed seismic array, may be about halfway between the top and bottom plates of the top float elements (3) as illustrated in FIG. 2a. It is the dynamic forces on the deflector paravane which makes it semi-submerge to the intended depth. In this manner, the top float elements (3) makes the paravane a semi-submerged vessel whereof only the streamlined top float elements (3) cut the water surface. This configuration makes the main body and the distance floats below run through the water much similar to how a submarine runs (except for the aslant longitudinal direction of the main body) which generally generates significantly reduced surface waves.

Moreover, the semisubmerged main hull itself will have no waterline under good weather conditions. The height of the top float elements (3) is 0.5 m as illustrated in FIG. 2c, and thus will run rather smoothly in sea waves up to about 0.5 m. The height of the entire deflector paravane is about 12 m including the float, so the height of the top float elements is about 4% of the deflector paravane's total height. The height of the top float elements (3) may vary between 0.4 and 2 m, or between 3% and 16% of the total height of the deflector paravane. As with semisubmersible petroleum platforms, the semisubmerged hulls experience very little heave compared to the heave surface hulls, mainly due to a relatively large mass submerged below the surface waves, and a very small waterline cross section area in the surface subject to the vertical forces of the surface waves. The paravane float of the invention will also experience less pitch and gear motion.

The reduced heave and pitch of the paravane float results in a reduced heave and pitch motion of the entire wing structure supported below, which will provide a more even, less varying pulling force at the towing line. This improves the general quality of the towing and reduces the mechanical low-frequency noise from the deflectors onto the seismic array spanned by them.

Further, the reduced variation of the towing force reduces the wear on the towing line, the bridle block (26), bridle lines (24, 25) and the attachment lugs for the bridle lines onto the horizontal plates (21, 22, 23) of the deflector wings, and shackles or eyelets of the bridle lines.

Another advantage of the invention is the feature of the generator distance float (41) below the main body to accommodate a Y-shaped tunnel with the generator (G). Such a position of the generator will provide protection for the generator's turbine from being hit by flotsam. Further, the positioning of the generator in a vertical tunnel at the Y-junction of the horizontal tunnel, and that the vertical tunnel extends up through the main body and the top float element (3), provides access for maintaining or replacing the generator without disassembling the distance float (4) from the main body for maintaining the generator.

The modularity of the main body into different sections has the advantage that the main body may be extended from two sets of top float elements (3) and distance floats, to three or four top float elements (3) and/or three or four distance floats, according to the size of the arrangement and number of vertical deflector wings below. Another advantage is that if one of the main body components is damaged such as by collision with flotsam, it may be replaced without replacing the entire float.

Another advantage of the invention is that the nose or aft section is asymmetrical so as for being used in either a port side or starboard configuration. Further, the nose or aft section may replace each other. The nose section is the part which first hits flotsam. Thus it is most vulnerable to crushing damage. If damaged, one only needs to have one type nose/aft replacement section because they are both equal and need only to be turned upside down to be used in an opposite port/starboard configuration.

Another advantage of the invention is that in order to change from port side to starboard configuration of a paravane float one only needs to disconnect the top float elements (3) and distance floats, and possibly the central bracket, to turn them to the opposite angle relative to the longitudinal axis of the main body.

All in all, in stead of carrying two complete replacement sets of port side and starboard paravane floats, it is only strictly necessary to carry on board one port side or starboard side paravane replacement float, and possibly carry more of such components that are most often subject to damage, such as the nose or aft section. All in all the need for float spare parts is generally halved.

BRIEF FIGURE CAPTIONS

The invention is illustrated in the attached drawings.

FIG. 1a is a perspective view of a seismic deflector of the invention. The perspective is seen from above the sea surface.

FIG. 1b corresponds to FIG. 1a but is as seen from below the sea surface.

FIG. 1c corresponds to FIG. 1a but is as seen from the side.

FIG. 1d corresponds to FIG. 1a but is as seen from the rear.

FIG. 1e corresponds to FIG. 1a but is as seen from the top.

FIG. 2c is a right side view of the same.

FIG. 2d is a longitudinal vertical section through the top float element (3), through the centre line of FIG. 2e.

FIG. 2e is a top view of the top float.

FIG. 2f is a rear view of the top float.

FIG. 2g is a top view of the port side paravane float of FIG. 2a, with the bow portion to the right.

FIG. 2i shows a right side elevation view of the paravane float of FIG. 2h.

FIG. 2j is a bottom view of the paravane float of the invention.

FIG. 4a shows a lateral elevation view along a so-called basic section module of the main body.

FIG. 4b is a vertical view of the same.

FIG. 4c is an end view of the same.

FIG. 4d is a perspective view of the basic section module of the main body.

FIG. 5a is a lateral elevation view of a so-called aft section of the main body, please see FIGS. 2a and 2g.

FIG. 5b is vertical view of the same aft section.

FIG. 5c is an end view of the same aft section.

FIG. 5d is a perspective view of the same aft section.

FIG. 8 shows a side elevation, a horizontal view and a perspective view of a so-called equipment well which comprises a sleeve extending down through the main body.

FIG. 9a is a perspective view of the distance float.

FIG. 9b is a side elevation view of the distance float.

FIG. 9c is a top elevation view of the distance float.

FIG. 9d is a front elevation view of the distance float.

FIG. 10a is a perspective view of the distance float developed further from the plain distance float of FIG. 9a to a generator distance float.

FIG. 10b is a right side elevation view of the generator distance float.

FIG. 10c is a horizontal plane section and partial plane view of the same.

FIG. 10d shows a rear elevation view of the generator distance float, looking into the outlet pipe.

FIG. 11a is a perspective view of the centre clamp.

FIG. 11b shows a top and partial horizontal section view of the centre clamp.

FIG. 11c is a side elevation view of the centre clamp, and

FIG. 11d is a rear elevation view of the same.

EMBODIMENTS OF THE INVENTION

Figure 1A:
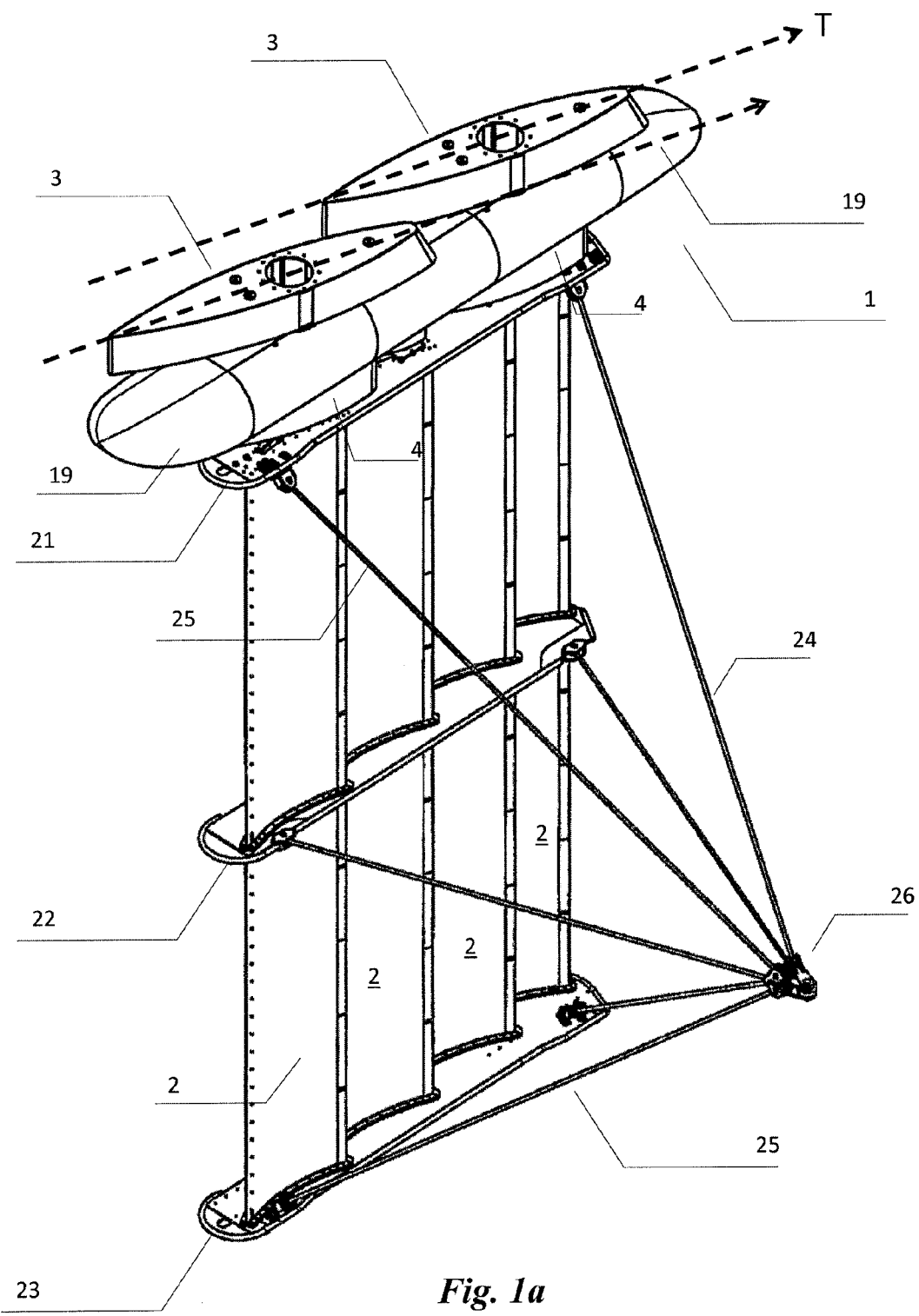
Figure 1B:
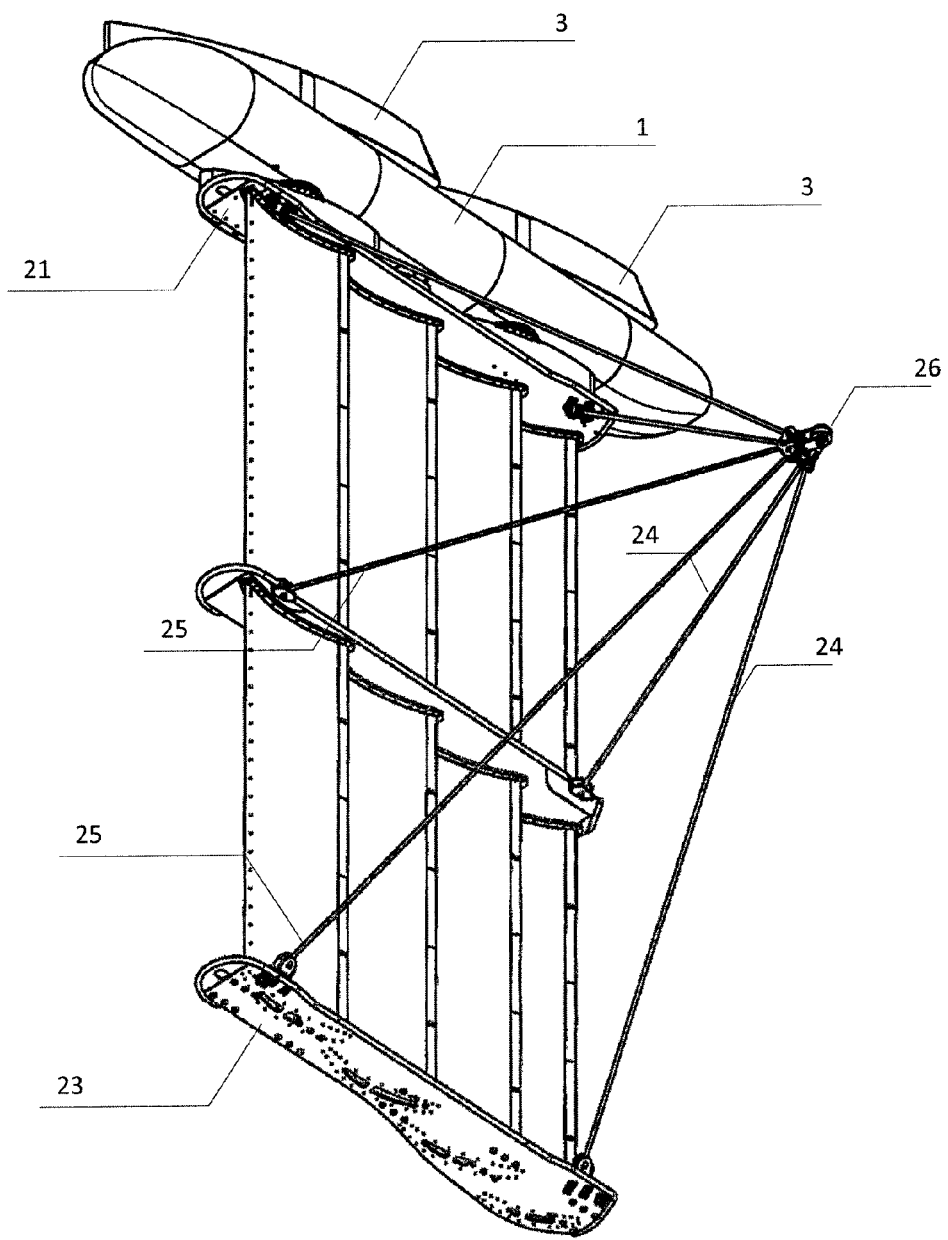

FIG. 1a is a perspective view of a marine seismic deflector of the invention. The perspective is seen from above the sea surface. The marine geophysical seismic array towing deflector comprises
a float main body (1) with one or more deflector wings (2) extending downwards into the sea, one or more slender top float element (3) arranged generally in a longitudinal direction on top of said main body (1).

Figure 1C:
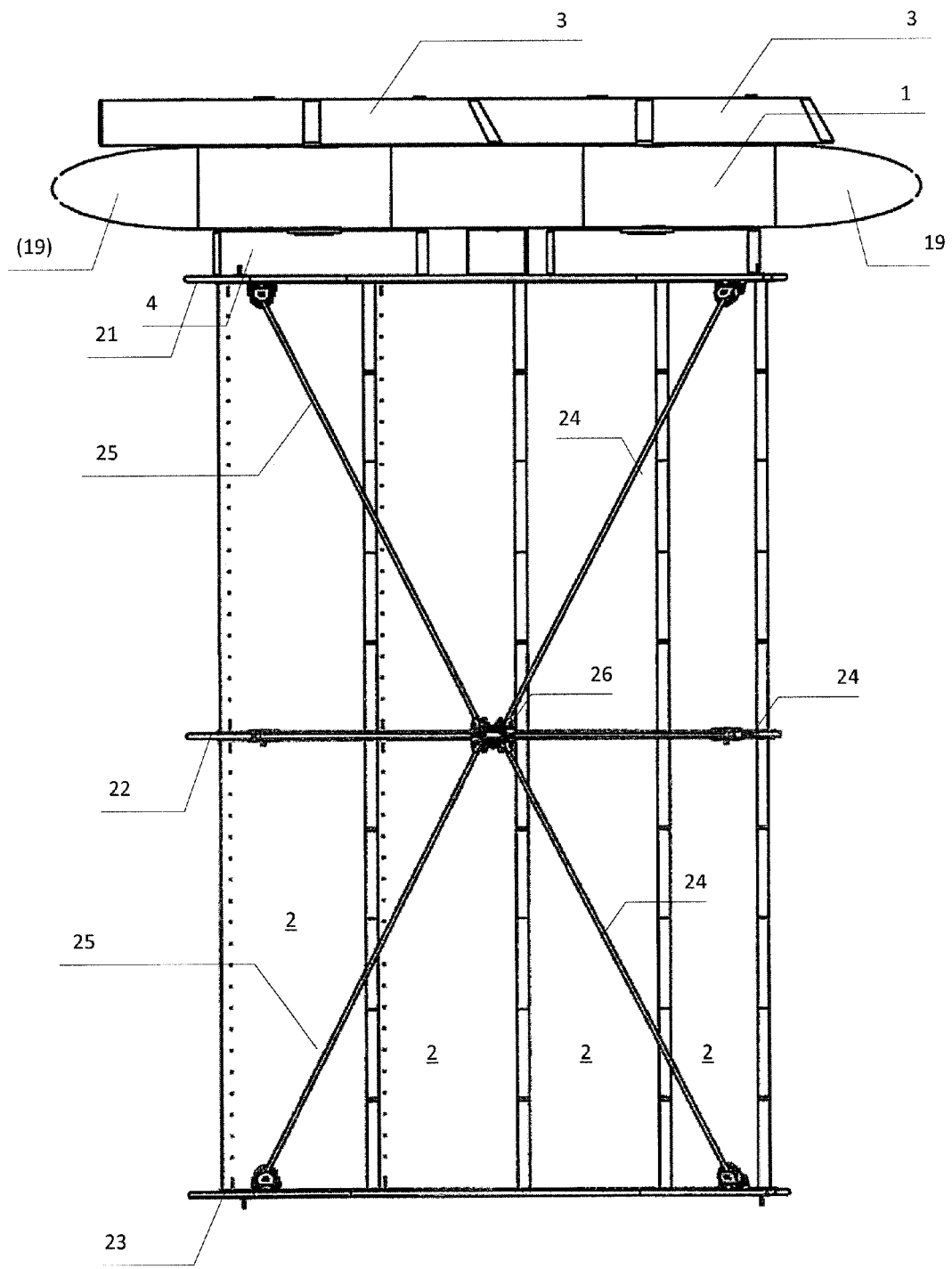
Figure 1D:
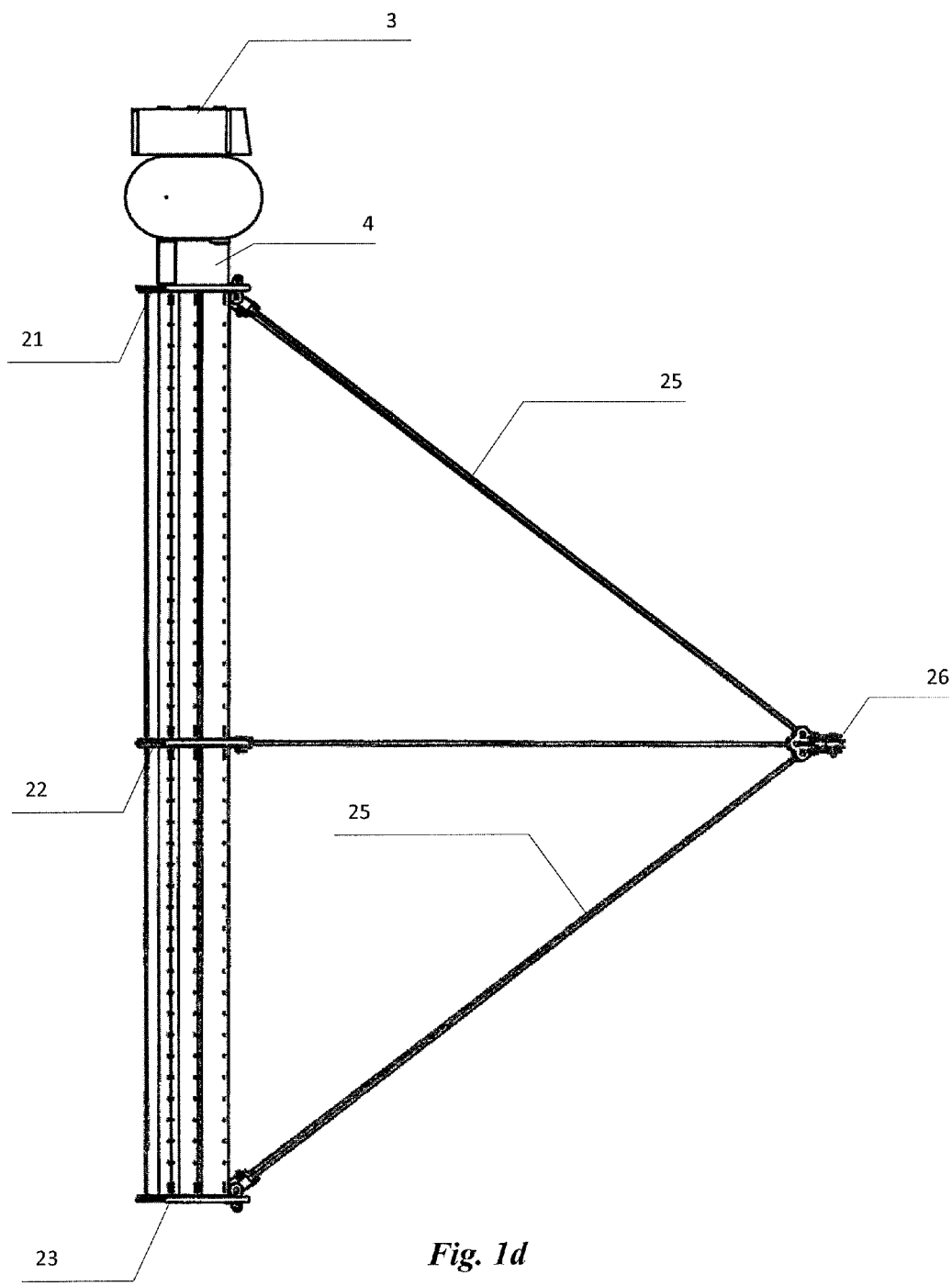
Figure 1E:
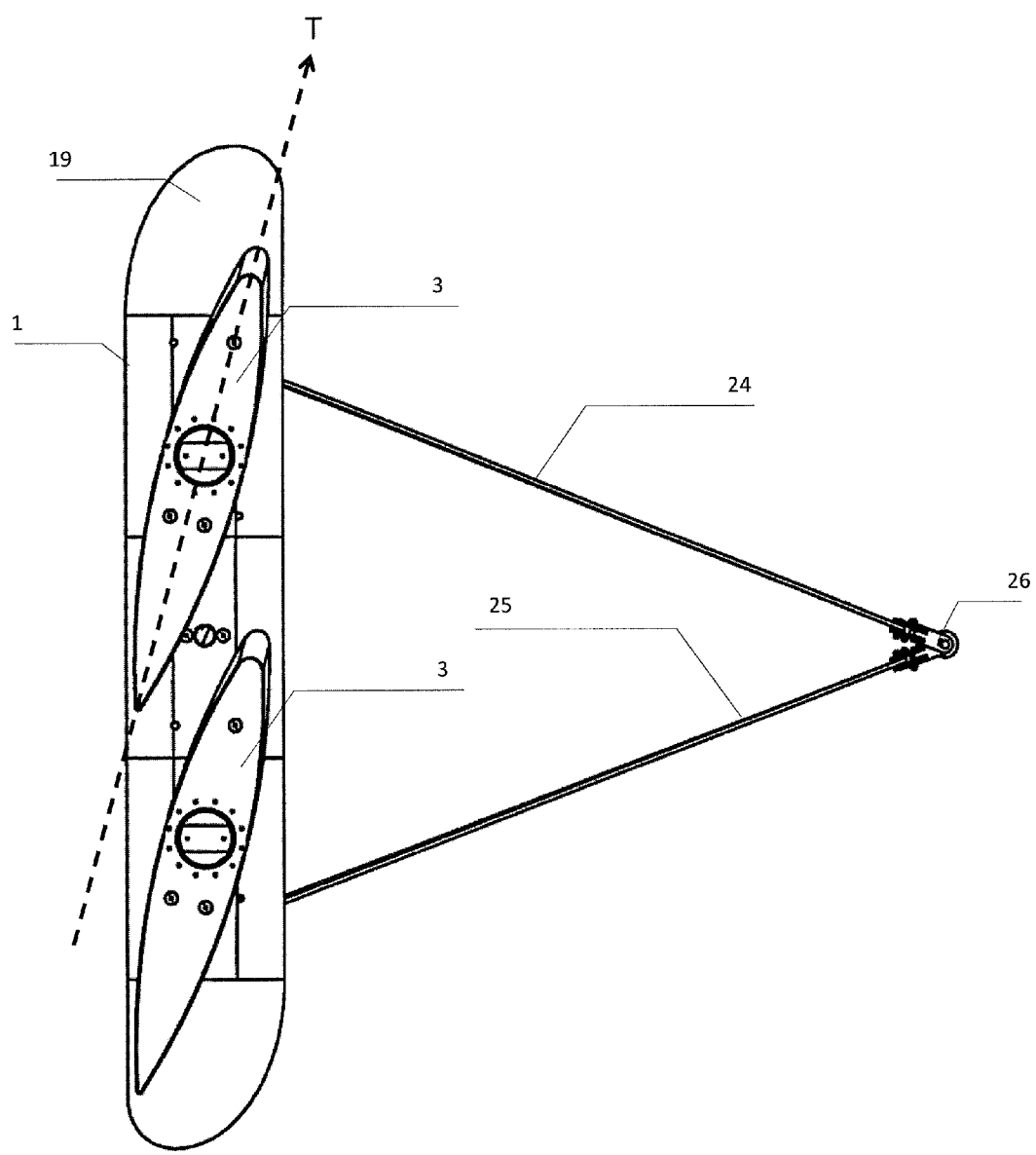

In a preferred embodiment the marine seismic deflector of the invention further comprises two or more distance floats (4, 41) each arranged beneath said main float (1) and for being connected directly or indirectly to said one or more deflector wings (2) below, please see FIG. 1c.

Stated otherwise, the invention may be seen as a marine geophysical seismic array towing deflector comprising a float main body (1) with one or more deflector wings (2) extending downwards into the sea, and—two or more distance floats (4, 41) each arranged beneath said main float (1) and for being connected directly or indirectly to said one or more deflector wings (2) below.

In a preferred embodiment of the float defined this way, it comprises one or more slender top float element (3) arranged generally in a longitudinal direction on top of said main body (1).

The deflector is towed using a towing line exerting a force F on the deflector, here in a port side deflector configuration, wherein said deflector follows the course indicated as T along the sea. When in an unloaded state without pull from the towing line nor any force from the seismic array to be towed, the water line of the passive deflector will be slightly below the main float. However, when in an operative towed state the deflector is arranged so as for the main float to submerge and the water line will be along the top floats, preferably about halfway between the bottom and the top of each top float. The deflectors usually appear in port and starboard side pairs. The deflector illustrated will then be attached to the port side of a trailing array of marine seismic streamers. The marine seismic streamers are used for 3-D acquisition of marine seismic data of a volume of rocks beneath the sea floor. The deflector illustrated has a length of 9500 mm, but the actual size may be higher or lower and depends on the size of the seismic array it shall spread. The deflector has a float section in the upper part and a four-wing section of vertically arranged wings in the main lower part. The deflector has at least two, preferably three horizontal plates (21, 22, 23) which hold the wings (2) in their top, middle and lower parts. There may be up to five horizontal plates. At least upper and lower bridle lines (24, 25) are extended from the fore and aft parts of each plate (21, 22, 23) to a bridle block (26) which is further connected to the towing line.

Figure 2A:
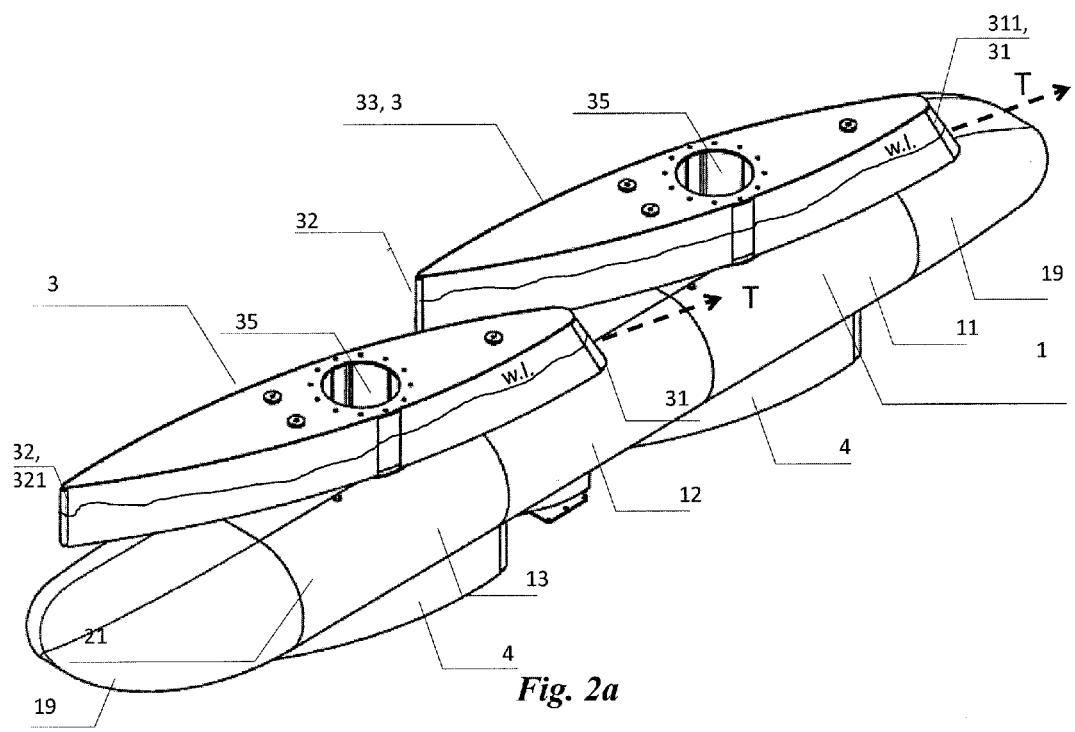
FIG. 2a is an overview of the paravane float of the deflector from FIG. 1a, shown without the deflector wings.
Figure 2B:
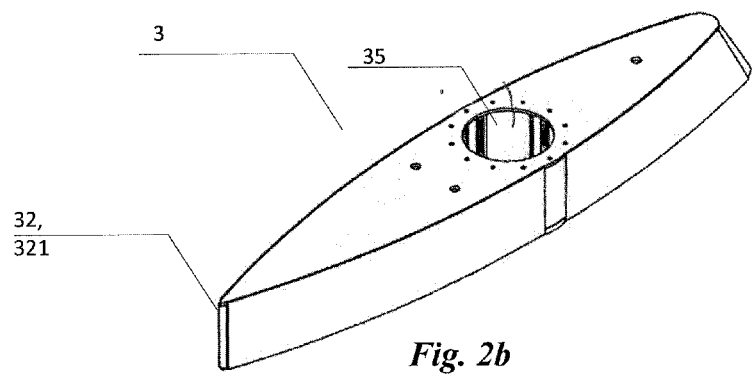
FIG. 2b is a perspective view of one of the top float elements (3).

FIG. 2a is an overview of the paravane float of the deflector from FIG. 1a, here shown without the deflector wings. The paravane float comprises a main body (1), at least one top float elements (3) which is arranged with its main axis aslant relative to the longitudinal direction of the main body (1). In an embodiment of the invention there is only one top float element. In a further embodiment of the invention the single top float element (3) is arranged on the fore part of the main body (1). In the illustrated embodiments shown in the attached drawings we have shown two top float elements (3). The top float elements (3) each have an extended bow portion (31) and a slightly longer stern portion (33), the top float (3) for running and cutting through the water surface with the water line of the paravane float residing more or less at the top float elements (3). The draught may be dynamically controlled by adjusting the wings and the bridle lines lengths, and further controlled by using ballast tanks. In this manner, each of the top float elements (3) will cut the surface approximately like the tower of a submarine in a semi-submerged submarine with the main hull below the sea. The top float elements (3) will run generally in the direction T along their own main axes as indicated in FIG. 2, with the main body running slantingly, here to the port side relative to the direction T. When not moving through the sea in a dynamically balanced state, the water line may reside below the top float, along the distance floats described below.

FIG. 2a further shows two so-called distance floats mounted to the bottom of the main body, for being connected to the upper horizontal plate (21) of the deflector, which is shown in FIGS. 1a, b, c, d. In this context, the upper horizontal plate (21) of the deflector and the remainder of the deflector below it may be one of the existing, standard deflector wing types.

FIG. 2e is a top view of the top float element (3), with the centre line A-A indicated, showing the straight, narrow, rounded aft stern (321).

FIG. 2g is a top view of the port side paravane float of FIG. 2a, with the bow portion (19) (which may also be an aft portion) to the right. The course direction is indicated by the arrow T pointing with a deviation from the longitudinal direction of the top float elements (3). Please notice the holes the bottom flange (36) of the top float and the top flange (16) of the main body is arranged for connecting with a deviation of + or −15 degrees, i.e. to either sides of the centreline of the main body, which allow for attachment of the top float (3) turned either 15 degrees to starboard or port side relative to the longitudinal axis of the main body (1). Please also see FIGS. 4b, 5d, and FIG. 6b, 6d.

The deviation angle shown in the drawings is 15 degrees. Please notice that the angle of deviation may be between 1 and 30 degrees, and the flange holes for mutual attachment must be made accordingly. In a more preferred embodiment the angle of deviation is between 12 and 18 degrees.

Figure 2H:
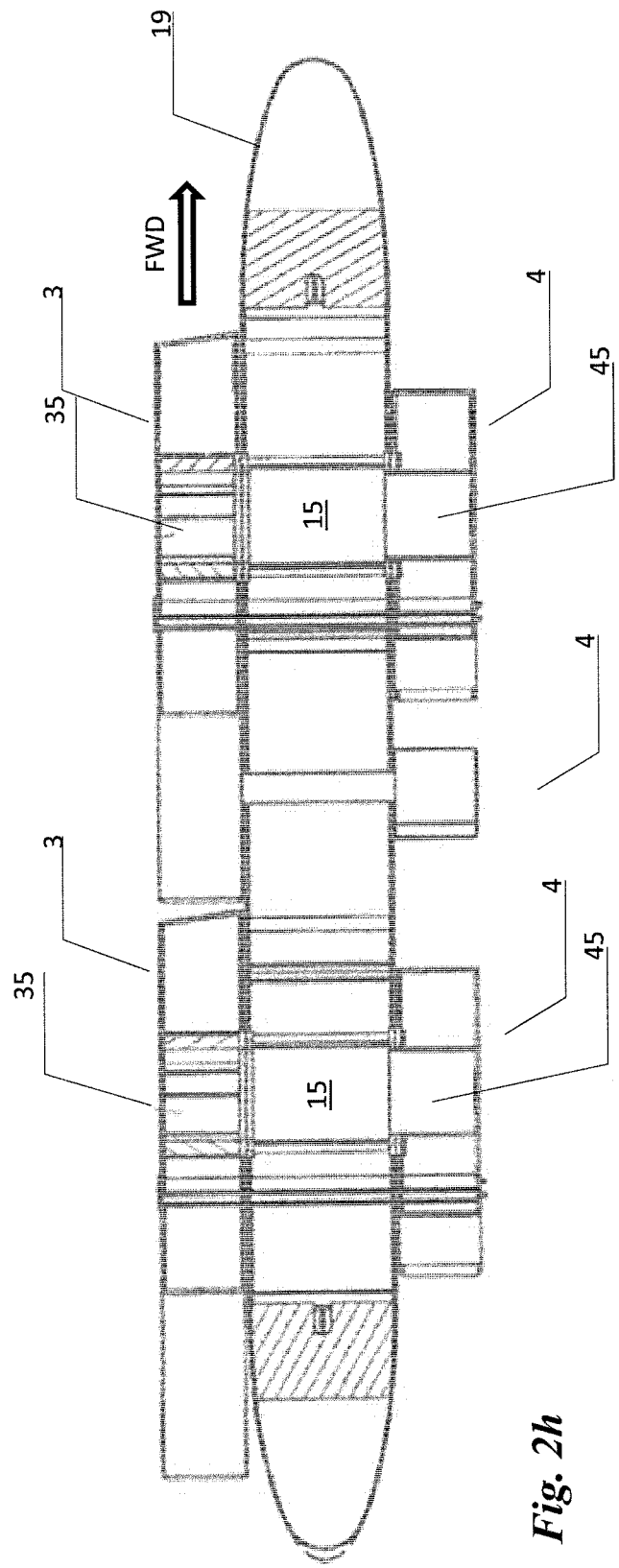
FIG. 2h is a longitudinal vertical section of the paravane float of the invention, showing the top float elements (3) on top of the main body and two distance floats below.

FIG. 2h is a longitudinal vertical section of the paravane float of the invention, showing the top float elements (3) on top of the main body and two distance floats below. A so-called center clamp is arranged between the distance floats.

FIG. 2i shows a right side elevation view of the paravane float of FIG. 2h. The subdivision into sections appears clearly from this image.

FIG. 2j is a bottom view of the paravane float of the invention, and shows the distance floats and the center clamp arranged at the underside of the main body. The distance floats are attached having the same main direction as the top float elements (3). The center clamp is also arranged with the same orientation as the top float elements (3) or the distance floats, so as for running through the sea with low resistance.

Figure 3A:
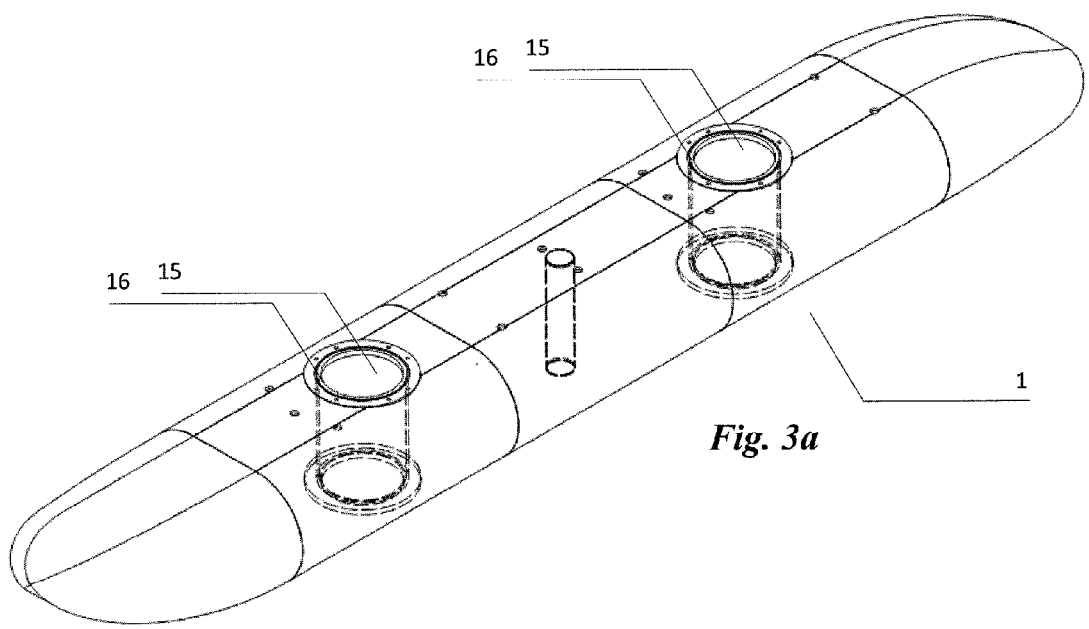
FIG. 3a is a perspective view of the main body.

FIG. 3a is a perspective view of the main body as such without top float elements (3) or distance floats attached.

Figure 3C:
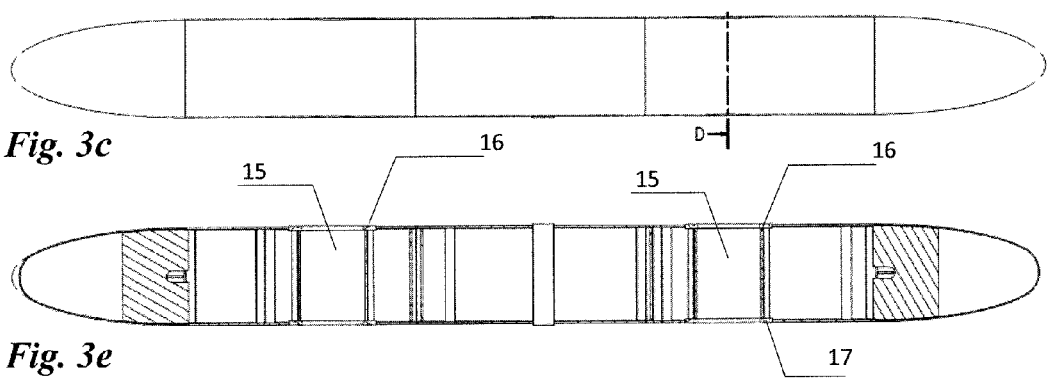
FIG. 3c is a right side elevation view of the main body.
Figure 3E:
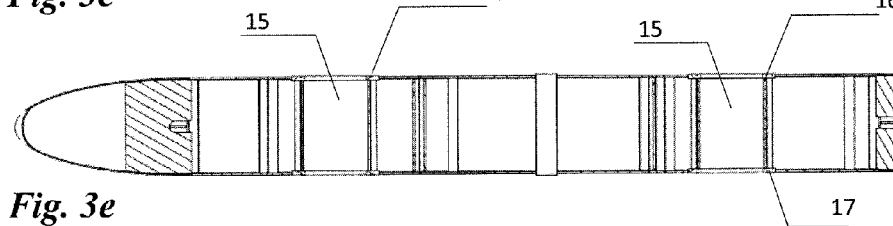
FIG. 3e is a longitudinal vertical section of FIG. 3b.
Figure 3B:
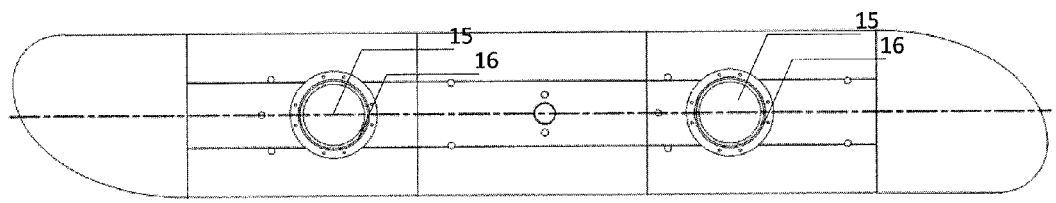
FIG. 3b is a bottom view of the paravane float of the invention similar to FIG. 2j, but without the distance floats and the centre clamp.

FIG. 3b is a bottom view of the paravane float of the invention similar to FIG. 2j, but without the distance floats and the centre clamp. Circular flanges for the vertical connections for the distance floats are shown, please see detail in FIG. 3h.

FIG. 3c is a right side elevation view of the main body similar to the one in FIG. 2i, but without top float elements (3), distance floats or centre clamp.

FIG. 3e is a longitudinal vertical section along BB of FIG. 3b.

Figure 3F:
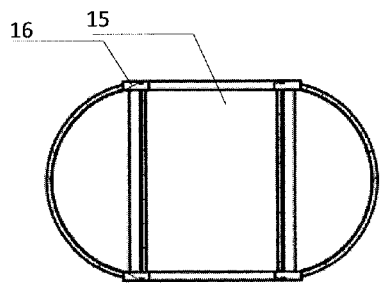
FIG. 3f is a vertical, lateral cross-section of FIG. 3c.

FIG. 3f is a cross-section through section A-A of FIG. 3c. The vertical channel (15) through A-A corresponds with the mounting flange's (36) circular opening (35) through the top float element (3) and the vertical circular channel (45) of the distance float (4) below.

From top to bottom the vertical channel through the deflector float comprises: an upper vertical channel (35)

through the top float and provided with a lower flange (36) for connection with the top flange (16) of the vertical channel (15) through the main body (1). The vertical channel (15) has at its lower end a flange (17) for connection to a top flange (46) of the distance float (4) which has a vertical channel (45) throughout its height. The lower end of the vertical channel (45) will end up at the upper horizontal plate (21) of the deflector wing assembly. In the vertical cylindrical channel (35) through the top float element (3), and through the vertically continuing channel (15), please see the so-called "equipment well" of FIG. 8, through the main body there is space for a waterproof cylindrical container holding a communication unit with an accumulator battery, please see FIG. 13, which closes the top of the opening flush with the top surface of the top float element (3). At the same time, the bottom of the cylindrical unit closes the top of the distance float (4) below. The distance float may comprise a generator (G), please see FIG. 10c. Lifting out the cylindrical unit will provide vertical access from the top to the generator (G) in the distance float (4) below.

Figure 3H:
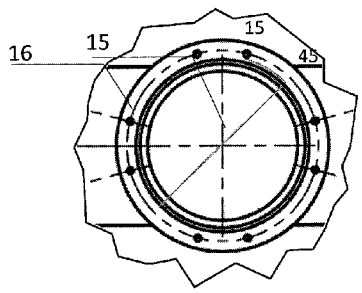
FIG. 3h is an enlarged bottom view a part of FIG. 3b, of the vertical bore through the main body and shows the attachment flange for the distance float.
Figure 3G:
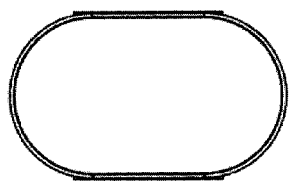
FIG. 3g is a front view of the main body.

FIG. 3g is a front view of the main body.

FIG. 3h is an enlarged bottom view a part of FIG. 3b, of the vertical bore through the main body and shows the attachment flange for the distance float (4). Please notice the holes of deviation 15 degrees to either sides of the centreline, which allow for attachment of the distance float (4) turned either 15 degrees to starboard or port side relative to the longitudinal axis of the main body.

Figure 3I:
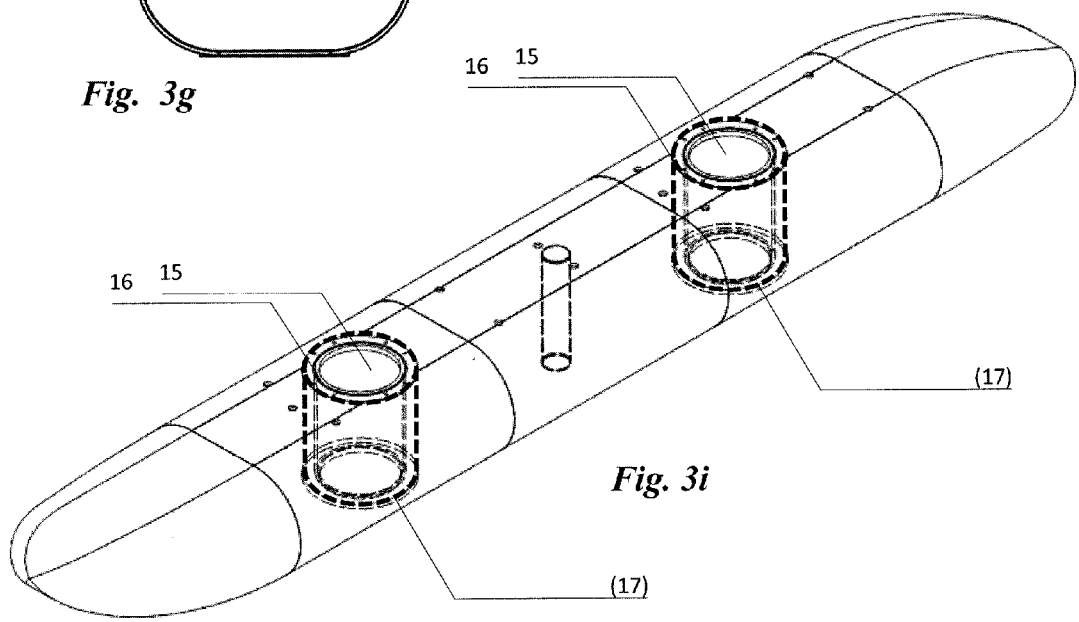
FIG. 3i is a perspective view of the main body showing the subdivision into sections.

FIG. 3i is a perspective view of the main body showing, as counted from the left, the aft rear portion, the aft section for the aft top float element (3), the middle section for the middle clamp, the fore section for the fore top float element (3), and the nose section to the right.

FIG. 4a shows a lateral elevation view of a so-called basic section module (11, 12, 13) of the main body.

FIG. 4b is a top view of the same.

FIG. 4c is an end view of the same.

FIG. 4d is a perspective view of the basic section module (11, 12, 13) of the main body. This is the starting point for building the prototype, but further elaborated versions such as illustrated in FIGS. 5, 6, and 7 may be rotationally moulded for serial manufacture.

Even though we here describe three module sections (11, 12, 13) of the main body (1). The main body (1) may in an embodiment be made in one material piece wherein the basic sections (11, 12, 13) are integral parts. This may be more relevant for a production model.

Please notice that the straight portion of the main body (1) including its elements (11, 12, 13) in total is made symmetrical about the horizontal central plane, so as for allowing it in total, regardless of being sectioned or not, or any of its elements (11, 12, 13), if sectioned, to be turned upside down in order to be converted to the opposite port side or starboard side configuration.

FIG. 5a is a lateral elevation view a so-called aft section (13) of the main body, please see FIGS. 2a and 2g; the section with a vertical cylindrical channel (15) for an equipment well and a top flange (16) for holding the aft top float element (3).

FIG. 5b is a top view of the same aft section, wherein hidden lines are drawn as broken lines.

FIG. 5c is an end view of the same aft section.

FIG. 5d is a perspective view of the same aft section. Please notice that the forward direction is to the left of FIGS. 5a, b, and d.

Figure 6A:
FIG. 6a is similar to FIG. 5a but for the fore section for holding the fore top float element (3) and the fore distance float.

FIG. 6a is similar to FIG. 5c but for the fore section for holding the fore top float element (3) and the fore distance float (4).

Please notice that the forward direction of FIG. 5a is to the right in FIGS. 6a, b, and d.

Figure 6B:
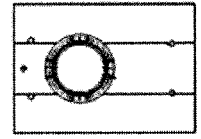
FIG. 6b is vertical view of the same fore section.

FIG. 6b is a top view of the same fore section.

Figure 6C:
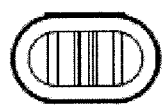
FIG. 6c is an end view of the same.

FIG. 6c is an end view of the same.

Figure 6D:
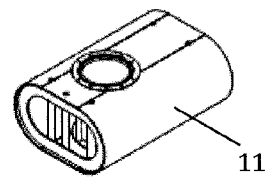
FIG. 6d is a perspective view of the fore section of the main body.

FIG. 6d is a perspective view of the fore section of the main body.

Please notice the reinforcing support pipes through the 30 degrees separated bolt holes through both the fore and aft sections. These support pipes allow the bolts to be tightened without the collapse of the hull of the fore and aft sections.

Figure 7A:
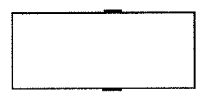
FIG. 7a is a lateral elevation view of the middle section of the main body.

FIG. 7a is a lateral elevation view of the middle section of the main body, with a vertical channel for the clamp section and two reinforcement through pipes, port and starboard, respectively, for holding bolts for holding a bolt stabilizing the leading portion of the rear top float element (3).

Figure 7B:
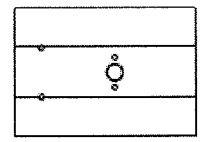
FIG. 7b is a plan view of the same.

FIG. 7b is a top view of the same.

Figure 7C:
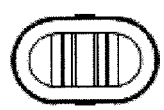
FIG. 7c is an end view of the same.

FIG. 7c is an end view of the same.

Figure 7D:
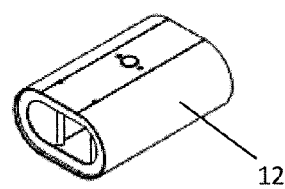
FIG. 7d is a perspective view of the same middle section.

FIG. 7d is a perspective view of the same middle section. Notice that the forward direction is to the right.

In general, the main body (1) comprises one or more straight sections (11, 12, 13) and at least one nose section (19) and a tail section (19). The straight sections (11, 12, 13) may be manufactured in one material piece for a production model, but for the prototype we have built them separately as sections. The nose section (19) has an asymmetrical nose portion and a symmetrical rear interface for connecting to a straight section (11, 12, 13) of the main body in ordinary or upside-down configuration. Said nose section (19) and said tail section (19) are generally equal but attached with opposite orientations. In an embodiment of the invention a forward section (11) is provided with one of said top flanges (16) for a forward one of said top floats (3), and a rear section (13) is provided with another of said flanges (16) for connecting to a rear one of said top floats (3), just as shown in FIG. 2a. Further, in an embodiment of the invention, a forward section (11) is provided with one of said bottom flanges (17) for connection of said distance floats (4), and a rear section (13) is provided with another of said flanges (17) for connecting to a rear one of said distance floats (4), please also see FIG. 2a, and FIGS. 1a and b. In an embodiment of the invention at least said nose section (19) is provided with a shock absorbing material (191) in its interior so as for absorbing impact energy and thus reducing damage in case of flotsam impact. The shock absorbing material may be a buoyant material so as to contribute to the buoyancy of the entire float assembly (1, 2, 3, 4). The nose section and its shock absorbing material may be manufactured in a resilient material so as for regaining its shape after a possible collision.

FIG. 8 shows a side elevation, a horizontal view and a perspective view of a so-called equipment well which comprises a sleeve extending down through the main body. The sleeve is provided with upper and lower flanges for being fixed in the top and bottom shell portions of the main body. The equipment well is a lining for the vertical passages through the fore and aft sections of the main body. The flanges are connected by reinforcement pipes so as to withstand vertical compression of the equipment well.

FIG. 9a is a perspective view of the distance float (4). In the embodiment shown, this is a so-called plain distance float (4). The distance float (4) has straight vertical walls, flat top with a flange for attachment to the bottom flange of the main body above, and bolt holes for attachment to the top horizontal plate of the general deflector wing structure below. Please notice that even though the number of top float elements (3) is one or two or more, and distance floats shown in FIG. 1a is two or more and the number of deflector wings are four, the deflector float system is modular and may be extended to three top float elements (3) and three distance floats with three, four or six deflector wings, only depending on the shape and size of the deflector wings.

FIG. 9b is a side elevation view if the distance float (4).

FIG. 9c is a top elevation view of the distance float (4), showing the lens-shape in the horizontal plane, the vertical cylindrical bow stern and aft stern portions, the vertical bolt sleeve holes, and the top flange for attachment to one of the main body's bottom flanges.

FIG. 9d is a front elevation view of the same.

FIG. 10a is a perspective view of the distance float (4) developed further from the plain distance float (4) of FIG. 9a to a generator distance float (41), wherein horizontal channels through the fore and aft portions have been added so as for connecting a water turbine (not shown) therebetween in the vertical sleeve at the center of the generator distance float (41).

FIG. 10b is a right side elevation view of the generator distance float (41).

FIG. 10c is a horizontal plane section and partial plane view of the same, with inlet pipes with inlets are arranged at the starboard and port sides of the fore part behind the bow stern. The inlet pipes are joined internally just ahead of the vertical cylindrical sleeve wall connecting the top and the bottom plates, to an internal inlet to the water turbine, and a corresponding outlet from the water turbine to a straight horizontal rearwards directed outlet pipe through the stern end of the generator distance float (41).

FIG. 10d shows a rear elevation view of the generator distance float (41), looking into the outlet pipe. When assembled with the main body and the top float element (3), the circular bottom of the instrument housing cylinder shown in FIG. 13 will close the top of the circular sleeve flange of the generator distance float (41), and the bottom of the sleeve is closed by the below upper horizontal plate on top of the deflector wing structure. The purpose of the generator distance float (41) is to provide electrical (or hydraulic) energy to the radio communication and to electrical or hydraulic control systems such as for the bridle lines' adjustment for steering. A main purpose of the generator is to maintain the voltage of the accumulator battery. An advantage of arranging the generator within the distance float is to provide a protected position so as for preventing flotsam of a size that would have damaging effect to the rotor to enter the generator inlet. The Y-shaped inlet channels do not have a directly forward directed opening, so as for flotsam to pass by without entering, while a required flow of water will enter due to the pressure difference between the two inlets and the rear outlet. Another advantage of the invention is that the position of the generator in the vertical tunnel provides easy access for maintenance without disassembling the entire top float and the distance float from the main body.

FIG. 11a is a perspective view of the centre clamp which is a small slender vertical structure with a cylindrical bow and aft stern part and generally vertical walls, for connecting the bottom of the main body, more specifically the bottom of the middle body section shown in FIG. 7a, b, c, d. to the horizontal top plate of the wing structure. The centre clamp is provided with square brackets and is provided with a vertical passage aligning with the vertical passage through the middle body section above. In addition to forming a mechanically stabilizing bracket between the underside of the main body (1, 12) and the upper horizontal plate (21) of the deflector wing array below, the centre clamp works as a protected passage for cables and/or hydraulic lines between electric and hydraulic equipment such as control systems and pingers on the deflector wing system.

FIG. 11b shows a top and partial horizontal section view of the centre clamp which shows the deviation angle of the main blade of the centre clamp, which is generally the same deviation angle set for the top float elements (3) and the distance floats.

Figure 12A:
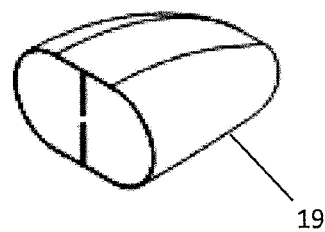
FIG. 12a is a perspective view of a nose or aft section.

This leads us to one of the main issues of the entire paravane float system the top float elements (3), the distance floats, and the centre clamps, and also the bow nose and the aft end as shown in FIGS. 12a, b, c, and d, may all be attached to the main body in either a port side deflector configuration as shown in FIGS. 1a and 2a, or in a starboard side deflector configuration, as all bolt holes are arranged symmetric about the longitudinal axis of the main body. The port side and the starboard side paravane configurations are mirror symmetrical embodiments which may be made from the shown module elements.

Please notice that the straight portion of the main body (1) including its elements (11, 12, 13) in total is made symmetrical about the horizontal central plane, so as for allowing it in total or any of its elements (11, 12, 13) to be turned upside down in order to be converted to the opposite port side or starboard side configuration. The leading and trailing end sections (19) will then follow accordingly.

Figure 12B:
FIG. 12b is a vertical longitudinal section of the nose or aft section as counted in the longitudinal vertical plane of the main body.
Figure 12C:
FIG. 12c is a horizontal section of the same.
Figure 12D:
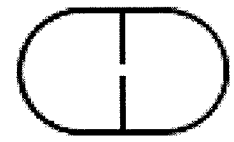
FIG. 12d is a vertical cross-section of the same.
Figure 13:
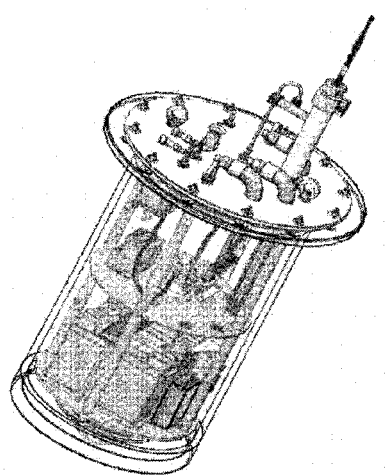
FIG. 13 is a perspective view of a waterproof cylindrical container holding a communication unit and an accumulator battery.

FIG. 11c is a side elevation view of the centre clamp, and
FIG. 11d is a rear elevation view of the same.
FIG. 12a is a perspective view of a nose or aft section. of the main body, for arrangement at the right or left end of the main body as shown in FIG. 2a.
FIG. 12b is a vertical longitudinal section of the nose or aft section as counted in the longitudinal vertical plane of the main body.
FIG. 12c is a horizontal section of the same. Please notice that in this section (and in any horizontal section) the nose or aft section is asymmetrical so as for being used in either a port side or starboard configuration. The section shown here, as seen from above, is for the port side configuration shown in FIGS. 1a and 2a.
FIG. 12d is a vertical cross-section of the same.
FIG. 13 is a perspective view of a waterproof cylindrical container holding a communication unit with an accumulator battery, which closes the top of the opening flush with the top surface of the top float, element (3).

The invention claimed is:
1. A marine geophysical deflector for towing seismic arrays in the sea, comprising:
a float main body with one or more deflector wings extending downwards into the sea;
two or more elongated top float elements having a longitudinally extending boat shape with bow portion and aft portion;
said one or more top float elements constituting an upper float element, placed on top of the float main body and arranged for letting said float run in a semisubmerged state so as for a waterline to be along said one or more top float element; and
said one or more top float elements arranged aslant relative to a longitudinal direction of said main float, in the direction of said main float's intended course through the sea.

2. The marine geophysical deflector of claim 1, wherein the height of the top float element may vary between 3% and 16% of the total height of a deflector paravane.

3. The marine geophysical deflector of claim 1, wherein said top float element's bow portion has a rounded fore stern.

4. The marine geophysical deflector according to claim 3, wherein said fore stern has a negative rise angle.

5. The marine geophysical deflector according to claim 1, wherein said top float element's aft end of an aft portion has a pointed aft stern and wherein said aft portion is longer than the corresponding fore portion.

6. The marine geophysical deflector according to claim 1, wherein said top float element's aft end stern is straight.

7. The marine geophysical deflector according to claim 1, wherein each top float element is provided with a circular flange arranged for being connected to a corresponding top flange on said main float.

8. The marine geophysical deflector of claim 7, wherein bolt holes of said circular flange at the bottom of said top float and said top flange of said main body are arranged for being connected with a given deviation to either sides of a centerline of said main body, which allow for attachment of the top float turned either to starboard or port side relative to the longitudinal axis of said main body.

9. The marine geophysical deflector of claim 8, wherein said deviation angle is between 1 and 30 degrees.

10. The marine geophysical deflector of claim 8, wherein said deviation angle is between 12 and 18 degrees.

11. The marine geophysical deflector of claim 8, wherein said deviation angle is 15 degrees.

12. The marine geophysical deflector according to claim 1, comprising a two or more distance floats each arranged beneath said main float and for being connected directly or indirectly to said one or more deflector wings below.

13. The marine geophysical deflector according to claim 1, wherein said top float comprises a through vertical channel of width between one half and three quarters of the width of said top float, and provided with a bottom flange for connection to a top flange of a corresponding through vertical channel of said main body.

14. The marine geophysical deflector of claim 7, wherein said through vertical channel of said main body is provided with a bottom flange for connecting with a top flange of a through vertical channel of a distance float below.

15. The marine geophysical deflector of claim 14, wherein bolt holes of said circular flange at the top of said distance float and said bottom flange of said main body are arranged for being connected with a given deviation angle to either sides of a centerline of said main body, which allow for attachment of said distance float turned either to starboard or port side relative to the longitudinal axis of said main body.

16. The marine geophysical deflector of claim 8, wherein the deviation angles of said one or more top floats and distance floats are equal and to the same side.

17. The marine geophysical deflector of claim 12, wherein said distance float is provided with vertical bores for bolt connection to an upper horizontal plate of said deflector wings.

18. The marine geophysical deflector of claim 1, wherein the number of said deflector wings are between two and six, and that said deflector wings are connected by said upper horizontal plate at their top end, and connected by a lower horizontal plate at their bottom end, said upper horizontal plate and said lower horizontal plate connected with fore and aft upper and lower bridle lines joined at their opposite end at a bridle block to a towing line.

19. The marine geophysical deflector of claim 14, wherein the lower end of the vertical channel will end up and be closed at the upper horizontal plate of the deflector wing assembly.

20. A marine geophysical deflector for towing seismic arrays in the sea, comprising:
a float main body with one or more deflector wings extending downwards into the sea wherein said main body comprises two or more straight sections and at least one nose section and a tail section;
wherein the nose section includes an asymmetrical nose portion and a symmetrical rear interface for connecting to a straight section in ordinary or upside-down configuration; and
wherein said nose section and said tail section are generally equal but attached with opposite orientations.

21. The marine geophysical deflector of claim 20, wherein the two or more straight sections include a forward section provided with a top flange for a forward top float, and a rear section provided with another flange for connecting to a rear top float.

22. The marine geophysical deflector of claim 20, wherein the two or more straight sections include a forward section provided with a bottom flange for connection of a forward distance float, and a rear section provided with another flange for connecting to a rear distance float.

23. The marine geophysical deflector of claim 20, wherein at least said nose section is provided with a shock absorbing material so as for reducing damage in case of flotsam impact.

24. The marine geophysical deflector of any of claim 20, wherein said straight sections are combined in one continuous material piece.

* * * * *